(12) United States Patent
Novack et al.

(10) Patent No.: US 7,765,398 B2
(45) Date of Patent: Jul. 27, 2010

(54) METHOD OF PROMULGATING A TRANSACTION TOOL TO A RECIPIENT

(75) Inventors: Brian M. Novack, St. Louis, MO (US); Daniel L. Madsen, Castro Valley, CA (US); Michael D. Cheaney, Arnold, MO (US); Timothy R. Thompson, Wentzville, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 394 days.

(21) Appl. No.: 11/176,612

(22) Filed: Jul. 7, 2005

(65) Prior Publication Data

US 2007/0011098 A1    Jan. 11, 2007

(51) Int. Cl.
*H04L 29/06* (2006.01)
*H04L 9/32* (2006.01)
(52) U.S. Cl. .................. 713/156; 713/158; 713/175
(58) Field of Classification Search .............. 705/64, 705/50
See application file for complete search history.

(56) References Cited

U.S. PATENT DOCUMENTS

| | | | | |
|---|---|---|---|---|
| 5,404,404 A * | 4/1995 | Novorita | ............... | 380/271 |
| 5,915,019 A * | 6/1999 | Ginter et al. | ............... | 705/54 |
| 5,956,489 A * | 9/1999 | San Andres et al. | ......... | 709/221 |
| 6,233,565 B1 * | 5/2001 | Lewis et al. | .............. | 705/35 |
| 6,385,725 B1 | 5/2002 | Baum-Waidner | | |
| 6,748,528 B1 | 6/2004 | Greenfield | | |
| 6,834,271 B1 * | 12/2004 | Hodgson et al. | .............. | 705/72 |
| 6,901,509 B1 * | 5/2005 | Kocher | ............... | 713/158 |
| 6,922,776 B2 * | 7/2005 | Cook et al. | .............. | 713/156 |
| 7,133,846 B1 * | 11/2006 | Ginter et al. | ............... | 705/54 |
| 7,181,017 B1 * | 2/2007 | Nagel et al. | ............... | 380/282 |
| 7,181,431 B2 * | 2/2007 | Wasilewski | ............... | 705/50 |
| 7,200,576 B2 * | 4/2007 | Steeves et al. | ............... | 705/64 |
| 7,209,889 B1 * | 4/2007 | Whitfield | ............... | 705/14 |
| 7,240,194 B2 * | 7/2007 | Hallin et al. | ............... | 713/156 |
| 7,350,205 B2 * | 3/2008 | Ji | ............... | 717/172 |
| 7,418,597 B2 * | 8/2008 | Thornton et al. | ............ | 713/175 |
| 2002/0129352 A1 * | 9/2002 | Brodersen et al. | ........... | 717/174 |
| 2003/0070070 A1 * | 4/2003 | Yeager et al. | ............... | 713/157 |
| 2003/0084179 A1 * | 5/2003 | Kime et al. | ............... | 709/231 |
| 2003/0182549 A1 * | 9/2003 | Hallin et al. | ............... | 713/156 |
| 2004/0199469 A1 | 10/2004 | Barillova et al. | | |
| 2004/0215959 A1 * | 10/2004 | Cook et al. | ............... | 713/156 |
| 2004/0230535 A1 * | 11/2004 | Binder et al. | ............... | 705/64 |
| 2004/0243805 A1 * | 12/2004 | Enokida | ............... | 713/175 |
| 2004/0250085 A1 * | 12/2004 | Tattan et al. | ............... | 713/186 |
| 2005/0033957 A1 | 2/2005 | Enokida | | |
| 2005/0044423 A1 * | 2/2005 | Mellmer et al. | ............. | 713/201 |
| 2005/0131645 A1 * | 6/2005 | Panopoulos | ............... | 701/214 |

(Continued)

*Primary Examiner*—Pierre M Vital
*Assistant Examiner*—Berhanu Mitiku
(74) *Attorney, Agent, or Firm*—Brooks Kushman P.C.

(57) ABSTRACT

A method for using an update engine to promulgate a transaction tool to a recipient. The method may include the steps of: generating a transaction tool operation request signal wherein the transaction tool operation request signal includes a request for a new transaction tool and/or an updated transaction tool, transmitting the transaction tool operation request signal to a transaction tool issuer, receiving a transaction tool update signal from the transaction tool issuer wherein the transaction tool update signal includes a new transaction tool and/or an updated transaction tool, determining the recipient, and transmitting the transaction tool update signal to the recipient.

10 Claims, 3 Drawing Sheets

U.S. PATENT DOCUMENTS

| | | | |
|---|---|---|---|
| 2005/0160476 A1* | 7/2005 | Kakii | 726/5 |
| 2005/0198157 A1* | 9/2005 | Young et al. | 709/206 |
| 2005/0204133 A1* | 9/2005 | LaLonde | 713/168 |
| 2006/0041507 A1* | 2/2006 | Novack et al. | 705/50 |
| 2006/0174106 A1* | 8/2006 | Bell et al. | 713/156 |
| 2007/0005981 A1* | 1/2007 | Miyazawa | 713/176 |

* cited by examiner

METHOD OF PROMULGATING A TRANSACTION TOOL TO A RECIPIENT

BACKGROUND OF THE INVENTION

1. Field of the Invention

The present invention relates to transaction tool promulgation.

2. Background Art

Transaction tools are instruments issued by a third party (i.e., transaction tool issuer) to facilitate transactions between a holder (i.e., transaction tool holder) and a recipient by "vouching" for a holder's identity and/or trustworthiness. Accordingly, transaction tools are used to authenticate the identity and/or trustworthiness of a holder.

Transaction tools may be managed for issuers and holders by management systems. As an example, for an issuer of credit cards, a management system may facilitate day-to-day transactions by verifying credit availability. Additionally, for an issuer of digital certificates, a management system may facilitate day-to-day transactions by authenticating the validity of a digital certificate. Furthermore, from a holder standpoint, a corporation may use a management system to manage digital certificates installed by employees on computers in the corporation's network. While transaction tool management systems generally facilitate day-to-day use of transaction tools, such systems do not manage the promulgation of a new and/or updated transaction tool. Accordingly, the holder of the transaction tool (i.e., the person and/or entity to which the transaction tool is initially issued) must manually notify recipients of the new and/or updated transaction tool if the holder desires to engage in future transactions with the recipient.

DETAILED DESCRIPTION

In view of the foregoing, one or more embodiments of the present invention may provide one or more of the following advantages: decrease the amount of human intervention required to acquire and/or update (i.e., renew, revoke, etc.) a transaction tool, increase transaction efficiency, and/or reduce transaction failures resulting from missing and/or outdated transaction tools.

Figure 1:
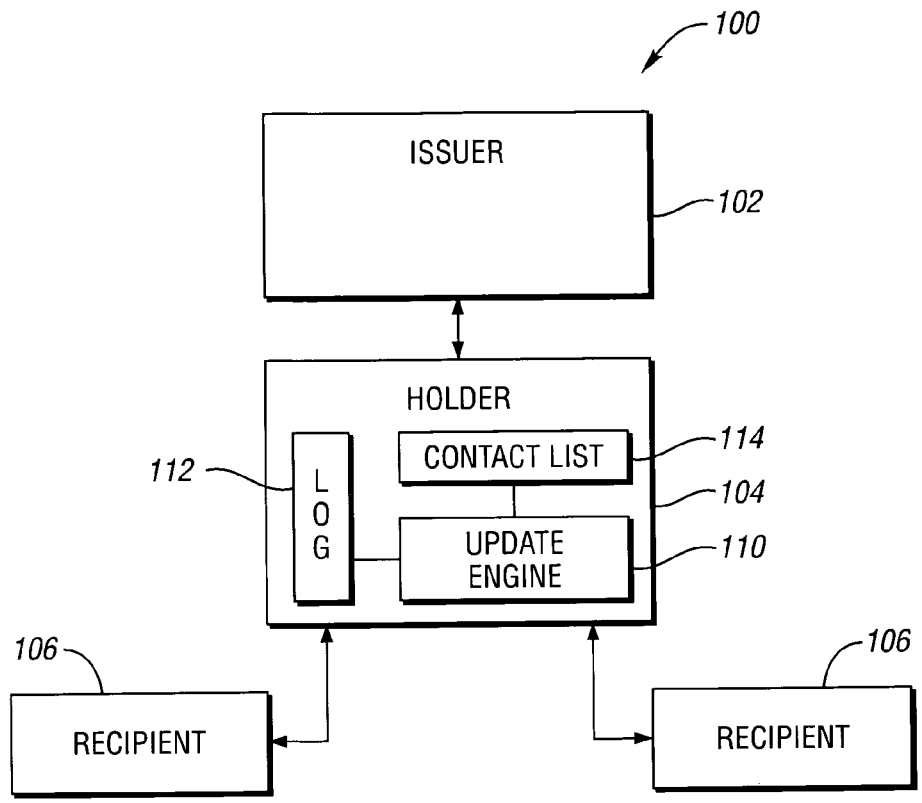
FIG. 1—A block diagram of a system for promulgating a transaction tool to a recipient in accordance with one non-limiting aspect of the present invention.

Referring to FIG. 1, a block diagram of a system 100 for promulgating a transaction tool to a recipient in accordance with one non-limiting aspect of the present invention is shown. The system 100, generally comprises a transaction tool issuer 102, a transaction tool holder 104, and a recipient device 106. The transaction tool issuer (i.e., issuer) 102 is generally electronically coupled to the transaction tool holder (i.e., holder) 104 such that electronic signals (e.g., communication signals) may be bi-directionally transferred between the issuer 102 and the holder 104. Similarly, the transaction tool holder 104 is generally electronically coupled to at least one recipient (i.e., recipient device) 106 such that electronic signals may be bi-directionally transferred between the holder 104 and each recipient 106.

In at least one embodiment of the present invention, the transaction tool issuer 102 is a computer or other electronic device which executes software application programs and/or which performs other logical exercises. However, the transaction tool issuer 102 may include any type of unit or entity which can generate and/or modify a transaction tool.

The transaction tool issuer 102 generally receives a Transaction Tool Operation Request signal (e.g., a request for a new transaction tool, a request to update an existing transaction tool, and the like) from the transaction tool holder 104, generates (i.e., issues) a Transaction Tool Update signal comprising a new and/or updated transaction tool in response to the Transaction Tool Operation Request signal, and presents the Transaction Tool Update signal (i.e, the new and/or updated transaction tool) to the transaction tool holder 104.

In one exemplary embodiment, the transaction tool issuer 102 is associated with an issuer of digital certificates and the Transaction Tool Update signal may comprise a new and/or updated public key. In another exemplary embodiment, the transaction tool issuer 102 is associated with an issuer of digital certificates and the Transaction Tool Update signal may comprise a new and/or updated private key. In yet another exemplary embodiment, the transaction tool issuer 102 is associated with a financial institution and the Transaction Tool Update signal may comprise new and/or updated credit card information (e.g., credit card number, expiration date, and the like). In still yet another exemplary embodiment, the transaction tool issuer 102 is associated with a financial institution and the Transaction Tool Update signal may comprise new and/or updated debit card information (e.g., debit card number, expiration date, and the like). However, the transaction tool issuer 102 may be associated with any business, organization, individual, and/or other entity which performs the function of issuing and/or maintaining a transaction tool. Similarly, the Transaction Tool Update signal may comprise any appropriate transaction tool information (i.e., data) to meet the design criteria of a particular application.

The transaction tool holder 104 is generally a computer or other electronic device which executes software application programs and/or which performs other logical exercises.

In at least one embodiment of the present invention, the transaction tool holder 104 is electronically coupled to an update engine 110. For example, in one non-limiting embodiment the update engine 110 is physically integrated into the transaction tool holder 104. In another non-limiting embodiment, the update engine 110 is physically remote to the transaction tool holder 104. In general, the update engine 110 may be physically located in any appropriate location to meet the design criteria of a particular application.

The update engine 110 generally manages the acquisition and maintenance (i.e., updating, renewal, etc.), of a transaction tool associated with the transaction tool holder 104. The update engine may be implemented as any suitable logical device to meet the design criterial of a particular application, such as software (e.g., an application program executable by the transaction tool holder 104), firmware, hardware (e.g., an Application Specific Integrated Circuit), or a combination thereof.

In one exemplary embodiment, the update engine 110 determines that a transaction tool associated with the transaction tool holder 104 is set to expire within a predetermined period of time (i.e., a predetermined expiration date of the transaction tool falls within a predetermined period of time). In response to the pending expiration of the associated transaction tool, the update engine 110 may generate a request for an updated transaction tool (i.e., Transaction Tool Operation Request signal), present the request to the transaction tool issuer 102, and receive a Transaction Tool Update signal from the transaction tool issuer 102 in response to the Transaction Tool Update signal.

In another exemplary embodiment, the update engine 110 determines that a new transaction tool is required for the transaction tool holder 104. The update engine 110 may determine that a new transaction tool is required in response to any appropriate trigger to meet the design criteria of a particular application, such as a user request, a signal from a transaction tool management system, and the like. Accordingly, the update engine 110 may generate a request for a new transaction tool (i.e., Transaction Tool Update signal), present the request to the transaction tool issuer 102, and receive a Transaction Tool Update signal from the transaction tool issuer 102 in response to the Transaction Tool Update signal.

The update engine 110 may also determine (i.e., identify, select, etc.) one or more recipient devices 106 (i.e., recipients), such as a computer in electronic communication with the transaction tool holder 104, to receive the new and/or updated Transaction Tool. In one exemplary embodiment, the recipients 106 are selected based at least in part on a contact list 114 (e.g., an electronic mail address book) electronically coupled to the update engine 110. In another exemplary embodiment, the update engine 110 is electronically coupled to a transaction log 112 and the update engine 110 selects the recipients 106 based at least in part on the transaction log 112. In the exemplary embodiment having the transaction log 112, the transaction log 112 may comprise device identification information for at least one device that has received a transaction tool related to the transaction tool holder 104. As will be appreciated by one of ordinary skill in the art, the present invention transcends any particular criteria used to determine the recipients 106 and the embodiments discussed are exemplary and non-limiting.

The update engine 110, via the transaction tool holder 104, generally presents (i.e., publishes, transmits) the new and/or updated transaction tool (i.e., credential, credentials) to one or more recipients 106 identified by the update engine 110. The update engine 110 may publish the new and/or updated credential to the recipients 106 using any appropriate communication link to meet the design criteria of a particular application, such as the Internet (e.g., using electronic mail and/or file transfer), satellite communication channels, dedicated communication wires, and the like.

In at least one embodiment of the present invention, the update engine 110 may publish the new and/or updated credential to a recipient 106 using a handshaking routine performed during a transaction between the recipient 106 and the update engine 110 and/or the transaction tool holder 104. The new and/or updated credential may be signed for providing confirmation that the new and/or updated credential is authentic.

Figure 2:
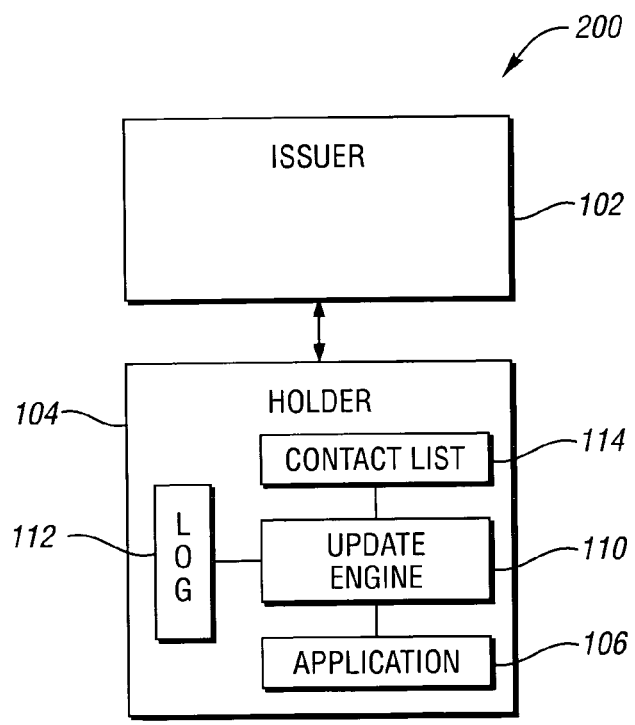
FIG. 2—A block diagram of a system for promulgating a transaction tool to a recipient in accordance with another non-limiting aspect of the present invention.

Referring to FIG. 2, a block diagram of a system 200 for promulgating a transaction tool to a recipient in accordance with another non-limiting aspect of the present invention. The system 200 may be implemented similarly to the system 100 with the exception that the recipient 106 is a software application program (i.e., application program). In the non-limiting embodiment shown in FIG. 2, the application program resides on the transaction tool holder 104. However, the application program may be resident on any appropriate device in electronic communication (i.e., electronically coupled) with the update engine 110 to meet the design criteria of a particular application.

In at least one non-limiting embodiment of the present invention, the transaction tool is a public key certificate and/or a private key for encrypting data, the application program is an electronic mail application, and the application program archives the transaction tool update such that data (e.g., electronic messages) encrypted using the transaction tool update may be deciphered beyond a predefined expiration date of the transaction tool update.

Figure 3:
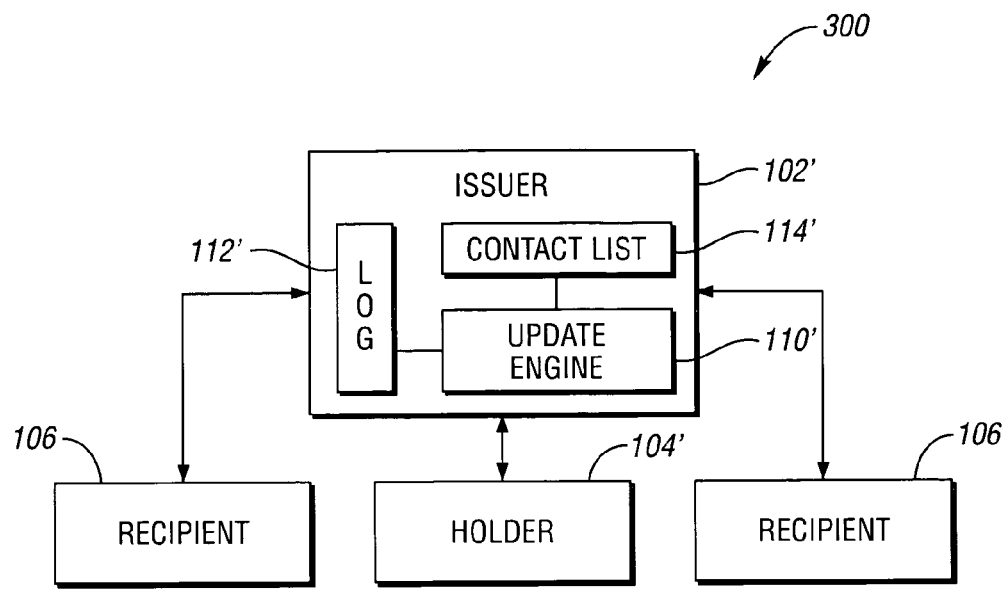
FIG. 3—A block diagram of a system for promulgating a transaction tool to a recipient in accordance with yet another non-limiting aspect of the present invention.

Referring to FIG. 3, a block diagram of a system 300 for promulgating a transaction tool to a recipient in accordance with another non-limiting aspect of the present invention is shown. The system 300 may be implemented similarly to the system 100 with the exception that the transaction tool issuer 102' comprises an update engine 110' and the transaction tool issuer 102' is generally electronically coupled to the recipient devices 106 such that electronic signals may be bi-directionally transferred between the transaction tool issuer 102' and each recipient 106.

More particularly, in the non-limiting embodiment shown in FIG. 3, the update engine 110' of the transaction tool issuer 102' generally determines (i.e., identifies, selects, etc.) one or more recipient devices 106 (i.e., recipients), such as a computer and/or application program in electronic communication with the transaction tool issuer 102', to receive a Transaction Tool Update signal (i.e., a new and/or updated Transaction Tool).

In one exemplary embodiment, the recipients 106 are selected based at least in part on a contact list 114' (e.g., an electronic mail address book) electronically coupled to the update engine 110'. In another exemplary embodiment, the update engine 110' is electronically coupled to a transaction log 112' and the update engine 110' selects the recipients 106 based at least in part on the transaction log 112'. In the exemplary embodiment having the transaction log 112', the transaction log 112' may comprise device identification information for at least one device that has received a transaction tool related to the transaction tool holder 104'. As will be appreciated by one of ordinary skill in the art, the present invention transcends any particular criteria used to determine the recipients 106 and the embodiments discussed are exemplary and non-limiting.

The update engine 110', via the transaction tool issuer 102', generally presents (i.e., publishes, transmits) the Transaction Tool Update signal (i.e., credential, credentials) to one or more recipients 106 identified by the update engine 110' and/or the transaction tool holder 104'. The update engine 110' generally publishes the new and/or updated credential using any appropriate communication link to meet the design criteria of a particular application, such as the Internet (e.g., using electronic mail and/or file transfer), satellite communication channels, dedicated communication wires, and the like.

In at least one embodiment of the present invention, the update engine 110' may publish the new and/or updated credential to a recipient 106 using a handshaking routine performed during a transaction between the recipient 106 and the update engine 110' and/or the transaction tool issuer 102'. The new and/or updated credential may be signed for providing confirmation that the new and/or updated credential is authentic.

Figure 4:
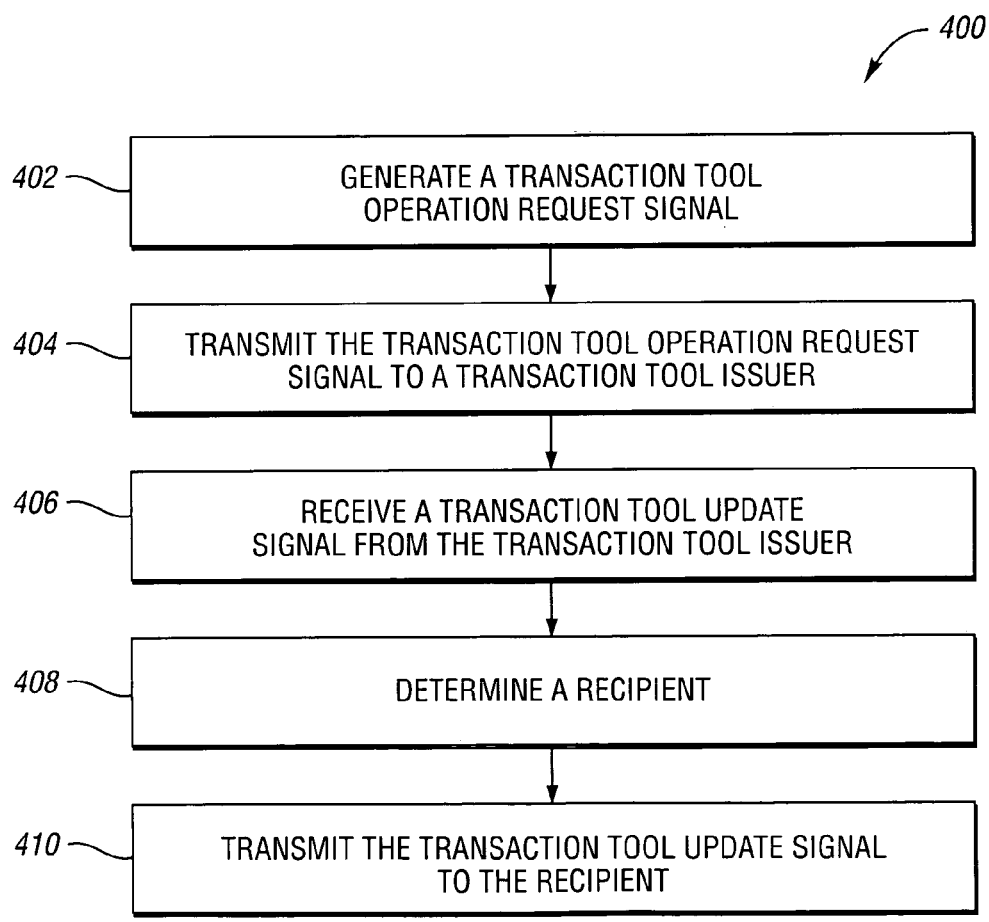
FIG. 4—A flow diagram of a method of promulgating a transaction tool to a recipient in accordance with one non-limiting aspect of the present invention.

Referring to FIG. 4, a flow diagram 400 of a method of promulgating a transaction tool to a recipient in accordance with one non-limiting aspect of the present invention is shown. The method 400 may be advantageously implemented in connection with the system 100, described previously in connection with FIG. 1, the system 200, described previously in connection with FIG. 2, and/or any appropriate system to meet the design criteria of a particular application. The method 400 generally comprises a plurality of blocks or steps (e.g., steps 402, 404, 406, 408, and 410) that may be performed serially. As will be appreciated by one of ordinary skill in the art, the steps of the method 400 may be performed in at least one non-serial (or non-sequential) order, and one or more steps may be omitted to meet the design criteria of a particular application.

As illustrated in step 402, a Transaction Tool Operation Request signal may be generated by an update engine (e.g., update engine 110). In at least one embodiment of the present invention, the Transaction Tool Operation Request signal is generated in response to a determination that a transaction tool associated with a transaction tool holder (e.g., transaction tool holder 104) requires renewal and/or updating. In at least one other embodiment of the present invention, the Transaction Tool Operation Request signal may be generated in response to a user and/or transaction tool management system requesting a new transaction tool. However, the Transaction Tool Operation Request signal may be generated in response to any appropriate trigger to meet the design criteria of a particular application.

At step 404, the update engine generally transmits the Transaction Tool Operation Request signal to a transaction tool issuer (e.g., the transaction tool issuer 102). The update engine may transmit the Transaction Tool Operation Request signal using any appropriate communication link to meet the design criteria of a particular application, such as the Internet (e.g., using electronic mail and/or file transfer), satellite communication channels, dedicated communication wires, and the like.

At step 406, the update engine generally receives a Transaction Tool Update signal from the transaction tool issuer. The Transaction Tool Update signal generally comprises a new and/or updated transaction tool generated by the transaction tool issuer in response to the Transaction Tool Operation Request signal.

At step 408, the update engine may determine one or more recipient devices (e.g., recipient 106). As previously discussed in connection with systems 100 and 200, the recipient may be any electronic device and/or application program in electronic communication (i.e., electronically coupled) with the update engine. The update engine may determine a recipient using any appropriate criteria to meet the design requirements of a particular application.

At step 410, the update engine generally transmits the Transaction Tool Update signal comprising the new and/or updated transaction tool to the recipient devices. The update engine may transmit the Transaction Tool Update signal to the recipient devices using any appropriate communication link to meet the design criteria of a particular application, such as the Internet (e.g., using electronic mail and/or file transfer), satellite communication channels, dedicated communication wires, and the like.

Figure 5:
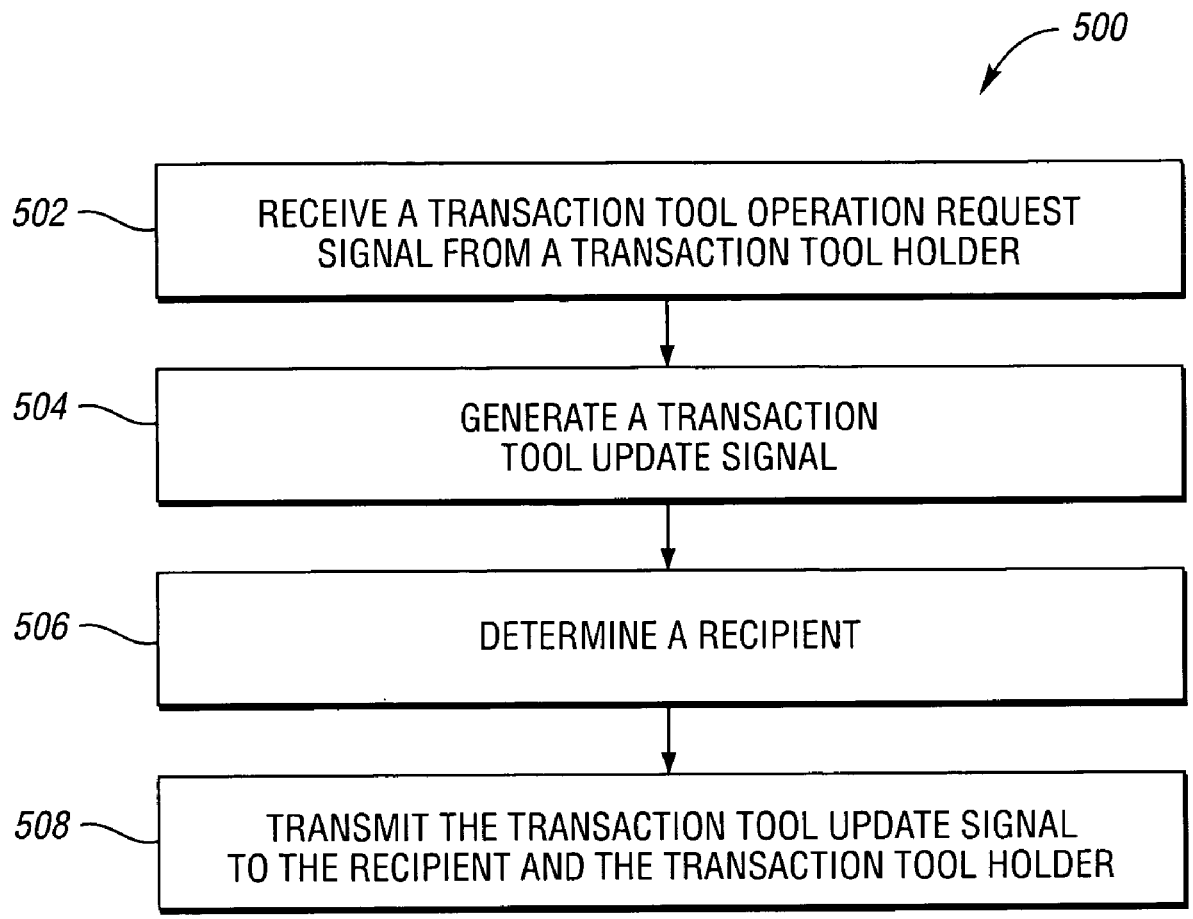
FIG. 5—A flow diagram of a method of promulgating a transaction tool to a recipient in accordance with another non-limiting aspect of the present invention.

Referring to FIG. 5, a flow diagram 500 of a method of promulgating a transaction tool to a recipient in accordance with another non-limiting aspect of the present invention is shown. The method 500 may be advantageously implemented in connection with the system 300, described previously in connection with FIG. 3, and/or any appropriate system to meet the design criteria of a particular application. The method 500 generally comprises a plurality of blocks or steps (e.g., steps 502, 504, 506, and 508) that may be performed serially. As will be appreciated by one of ordinary skill in the art, the steps of the method 500 may be performed in at least one non-serial (or non-sequential) order, and one or more steps may be omitted to meet the design criteria of a particular application.

As illustrated in step 502, an update engine (e.g., update engine 110') may receive a Transaction Tool Operation Request signal from a transaction tool holder (e.g., transaction tool holder 104'). The Transaction Tool Operation Request signal generally comprises a request for a new and/or updated transaction tool.

At step 504, the update engine may generate a Transaction Tool Update signal comprising a new and/or updated transaction tool in response to the Transaction Tool Operation Request signal.

At step 506, the update engine generally determines one or more recipient devices (e.g., recipient 106). As previously discussed, the recipient may be any electronic device and/or application program in electronic communication (i.e., electronically coupled) with the update engine. The update engine may determine a recipient using any appropriate criteria to meet the design requirements of a particular application.

At step 508, the update engine generally transmits the Transaction Tool Update signal comprising the new and/or updated transaction tool to the recipient devices and/or the transaction tool holder. The update engine may transmit the Transaction Tool Update signal to the recipient devices and/or the transaction tool holder using any appropriate communication link to meet the design criteria of a particular application, such as the Internet (e.g., using electronic mail and/or file transfer), satellite communication channels, dedicated communication wires, and the like.

In accordance with various embodiments of the present invention, the methods described herein are intended for operation as software programs running on a computer processor. Dedicated hardware implementations including, but not limited to, Application Specific Integrated Circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:

generating, at an update engine in communication with a first computer, a request upon determining that an old certificate associated by the first computer with the first computer is to be replaced with a new certificate, wherein a given certificate facilitates communication between the first computer and another computer by authenticating the first computer when the given certificate is associated by the first computer with the first computer and is associated by the other computer with the first computer;

transmitting the request from the update engine to a certificate issuer;

receiving, at the update engine, the new certificate from the certificate issuer in response to the request;

transmitting the new certificate from the update engine to the first computer for the first computer to associate the new certificate with the first computer in place of the old certificate;

in response to receiving the new certificate at the update engine, accessing, by the update engine, the first computer to access an electronic mail address book of the first computer having information identifying a prior communication instance between the first computer and a second computer facilitated by the old certificate determining at the update engine that the second computer is associating the old certificate with the first computer based on the information of the electronic mail address book of the first computer; and upon the update engine determining that the second computer is associating the old certificate with the first computer, transmitting the new certificate directly from the update engine to the second computer along a communication path independent of the certificate issuer for the second computer to associate the new certificate with the first computer in place of the old certificate.

2. The method of claim 1 wherein each certificate comprises a public key encryption certificate.

3. The method of claim 1 wherein the update engine transmits the new certificate to the second computer using at least one of electronic mail and handshaking.

4. The method of claim 1 wherein the second computer includes an application program electronically coupled to the first computer.

5. The method of claim 4 wherein the application program is an electronic mail application, the electronic mail application archives the new certificate.

6. A method comprising:

generating, at a first computer, a request upon determining that an old certificate associated by the first computer with the first computer is to be replaced with a new certificate, wherein a given certificate facilitates communication between the first computer and another computer by authenticating the first computer when the given certificate is associated by the first computer with the first computer and is associated by the other computer with the first computer;

transmitting the request from the first computer to a certificate issuer;

receiving, at the first computer, the new certificate from the certificate issuer in response to the request;

associating, by the first computer, the new certificate with the first computer in place of the old certificate;

in response to the first computer associating the new certificate with the first computer in place of the old certificate, automatically accessing by the first computer a transaction log of the first computer having information identifying a prior communication instance between the first computer and a second computer and automatically determining at the first computer that the second computer is associating the old certificate with the first computer based on the information of the transaction log of the first computer; and upon the first computer determining that the second computer is associating the old certificate with the first computer, automatically transmitting the new certificate directly from the first computer to the second computer along a communication path independent of the certificate issuer for the second computer to associate the new certificate with the first computer in place of the old certificate.

7. The method of claim 6 wherein each certificate is a digital certificate.

8. The method of claim 6 wherein each certificate comprises a public key encryption certificate.

9. The method of claim 6 wherein the first computer includes an electronic mail application program electronically coupled to the second computer, 10. The method of claim 6 wherein:

automatically transmitting the new certificate from the first computer to the second computer includes using at least one of electronic mail and handshaking.

* * * * *